H. M. KINNEY.
MOTOR WAGON.
APPLICATION FILED AUG. 12, 1911.

1,030,735.

Patented June 25, 1912.
3 SHEETS—SHEET 1.

Witnesses

Inventor

H. M. KINNEY.
MOTOR WAGON.
APPLICATION FILED AUG. 12, 1911.

1,030,735.

Patented June 25, 1912.

3 SHEETS—SHEET 3.

Witnesses
Alton L. Wyman.
R. W. Pierce

Inventor
Henry M. Kinney

UNITED STATES PATENT OFFICE.

HENRY M. KINNEY, OF WINONA, MINNESOTA, ASSIGNOR TO WINONA WAGON COMPANY, OF WINONA, MINNESOTA, A CORPORATION.

MOTOR-WAGON.

1,030,735.     Specification of Letters Patent.     Patented June 25, 1912.

Application filed August 12, 1911. Serial No. 643,764.

*To all whom it may concern:*

Be it known that I, HENRY M. KINNEY, a citizen of the United States, residing at Winona, in the county of Winona and State of Minnesota, have invented a new and useful Motor-Wagon, of which the following is a specification.

My invention consists broadly of the application of an internal combustion engine to the running gears of an ordinary farm wagon, the engine being designed to fit on the wagon gear with only a few slight changes in the form of the ordinary wagon gears.

The tongue is removed from the wagon and the engine attached under the rear axle, a special raised axle being used for the purpose.

A special steering gear is attached to the two front wheels and means provided whereby the operator may control the engine and steer the front wheels from one position on the wagon. Driving power is transmitted from the engine and transmitted to the two rear wheels by means of chains running over sprocket wheels attached to the two rear wheels of the running gears.

The engine may be taken off and the wagon drawn by horses in the usual manner whenever desired.

In order to enable those familiar with the art to which my invention relates to more fully understand the merits thereof reference is made to the accompanying drawing in which like figures of reference denote corresponding parts throughout the several views.

Figure 1:
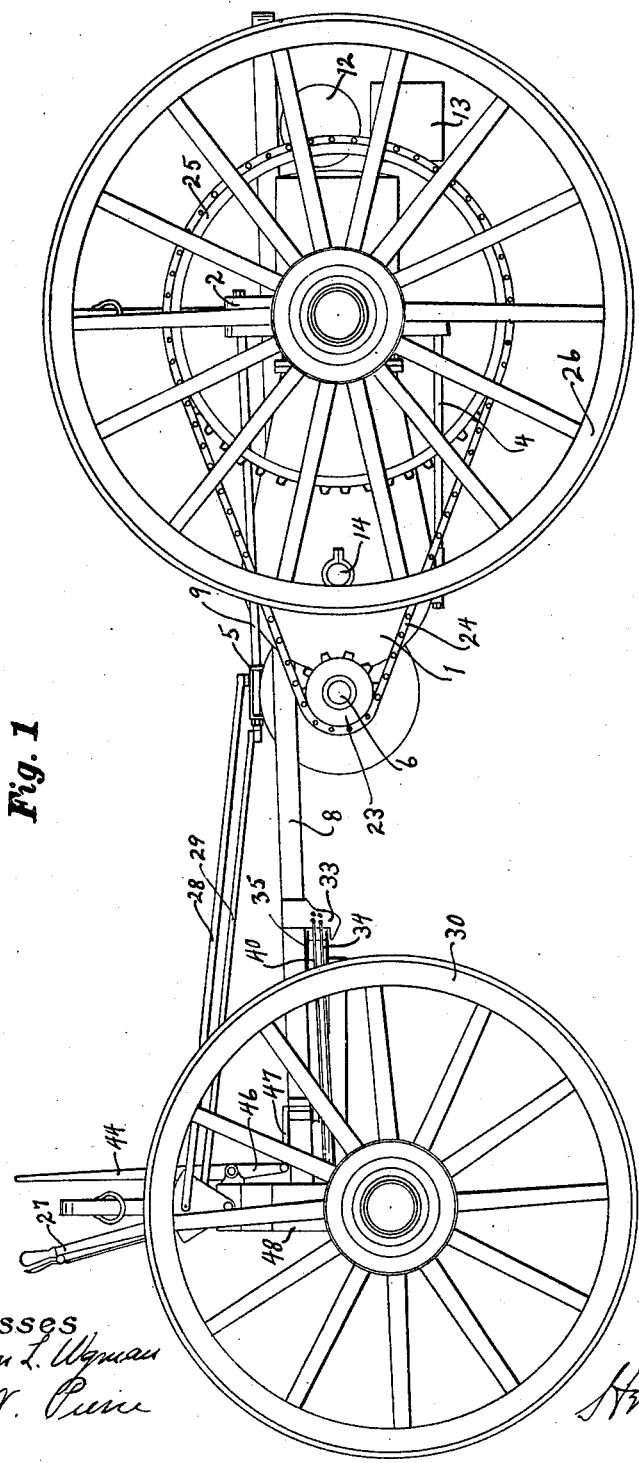
Figure 2:
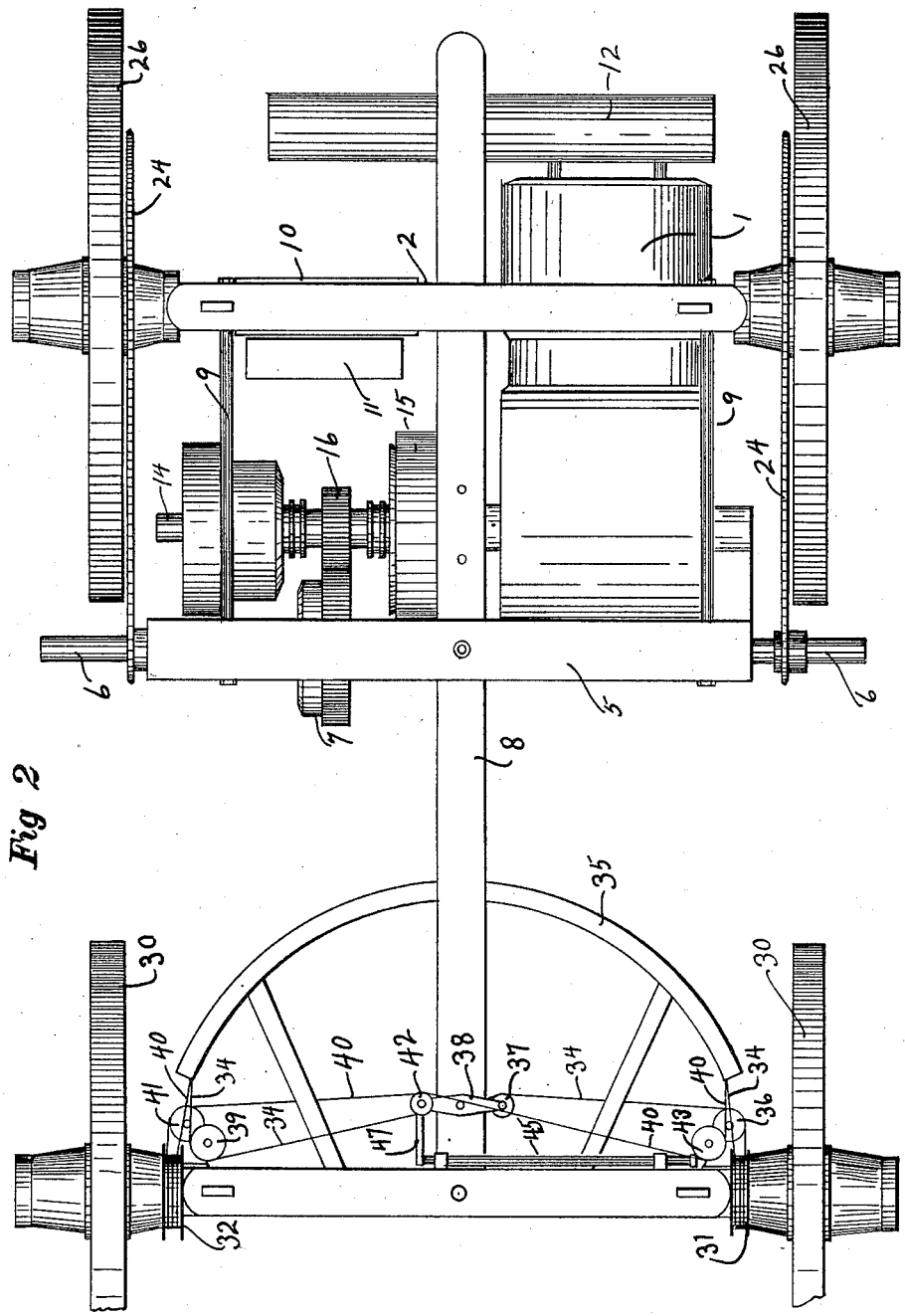
Figure 3:
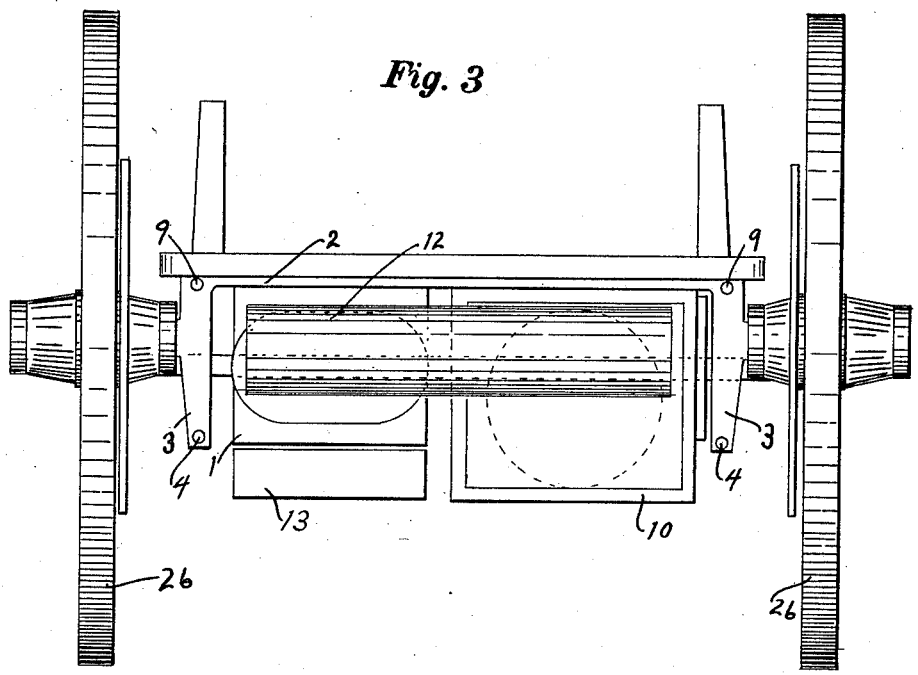
Figure 4:
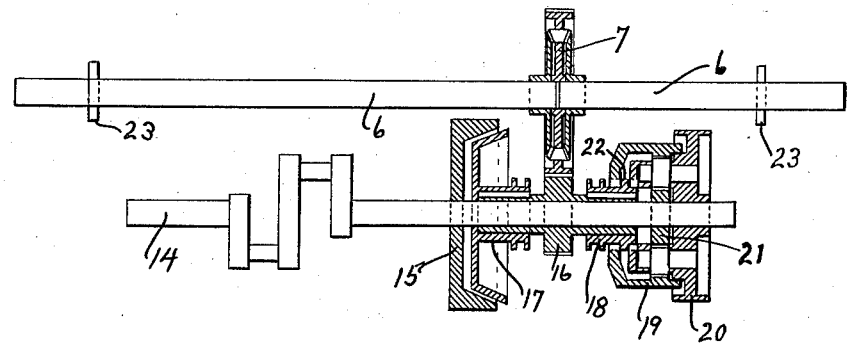

In the drawings: Figure 1 is a side elevation of a preferred construction of my machine. Fig. 2 is a partly broken away plan view with some parts omitted. Fig. 3 is a rear view and Fig. 4 is a partly sectional detail of the transmission gears.

As will be seen in Fig. 1 an internal combustion engine 1 is mounted under the rear axle 2 of a common farm wagon, the axle 2 (Fig. 3) being raised to a sufficient height to give the engine ample road clearance. Extension arms 3, 3 depend downward from each side of the rear axle 2 forming a support for anchor rods 4, 4 extending from the lower part of the engine 1. A channel bar 5 extends horizontally across the wagon carrying beneath it the counter shaft 6 which is divided, its two parts being connected by a differential gearing 7 in the usual manner.

The channel bar 5 rests upon the reach 8 and helps support the front end of the engine 1. Additional support is given the engine by guy rods 9, 9 attached to the channel bar 5 and extending to the rear axle 2. A radiator 10 is suspended under the rear axle 2 at one side of the engine 1 and cooled by a fan 11 of any desired form. An exhaust muffler 12 is mounted back of the engine 11, and a fuel tank 13 is carried below the muffler 12. The crank shaft 14 of the engine 1 is elongated and carries a special speed transmission gearing shown most plainly in Fig. 4. A fly-wheel 15 is mounted on the crank shaft 14 and integrally connected therewith and is provided with an inner coned friction face. A combined sleeve and driving gear wheel 16 is loosely mounted on the crank shaft 14 and carries at either end a sliding grooved sleeve 17 and 18, both sleeves being feather keyed to the long sleeve 16.

The sleeve 17 is provided with a coned friction face adapted to engage the coned inner friction face of the fly-wheel 15 when moved to its extreme position to the left, thus driving the sleeve and gear wheel 16 forward at the same speed as the fly-wheel 15 and crank shaft 14. The sleeve 18 is provided with a plurality of lugs 22 adapted to fit into slots in the two brake wheels 19, 20. A spur gear wheel 21 is integrally connected to the crank-shaft 14 and engages a plurality of planetary gears carried by the brake wheel 20. These planetary gears in turn engage the teeth of an internal gear on the inner surface of the brake wheel 19. It will thus be seen that when a brake is applied to the brake wheel 19, and the sleeve 18 is thrown to the right until its lugs 22 engage the slots in the brake wheel 20, the sleeve and gear 16 will be driven at a slower speed ahead than when connected to the fly-wheel direct by means of the frictions 15, 17. When a brake is applied to the brake wheel 20 and the sleeve 18 is thrown to its extreme position to the left until its lugs 22 engage the slots in the brake wheel 19, the gear 16 will be driven in a slow reverse direction. The driving gear 16 engages the outer teeth of the gear 7 thus driving the counter shaft in the desired direction. Small sprocket wheels 23, 23 drive two chains 24, 24 which run over large sprockets 25, 25 attached to the rear wheels 26, 26 of the wagon gear. The brake bands are not shown on the brake wheels in the drawings, the entire control being omitted with exception of the lever 27 and rods 28, 29 in Fig. 1.

The front wheels 30, 30 are connected with the rear wheels 26, 26 by means of the usual reach 8. A special steering device is employed embodying two drums 31, 32 integrally connected one to each front wheel 30, 30. A bracket 33 is attached to the reach 8 and one end of a small cable 34 is secured thereto. The cable 34 then passes through the groove of the bent channel iron 35 and is loosely wrapped around the drum 31, thence over the pulley 36 attached to the front axle near the drum 31 and over the tightener pulley 37 carried on one end of the swiveled bar 38 on the reach 8 thence over the pulley 39 and around the channel 35 to the bracket 33 where its other end is fastened. Another cable 40 is fastened to the bracket 33 and passing through the channel 35 is loosely wrapped around the drum 32 thence over pulleys 41, 42, 43 and through the bent channel 35 is secured by its other end to the bracket 33. By means of the hand lever 44, the crank 46 and link 47, the swiveled bar 38 with its two tightener pulleys 37, 42 may be shifted back and forth on its axis thus alternately tightening and loosening the cables 34, 40 and causing them to alternately grip the drums 31, 32 as the front wheels 30, 30 turn and thus to turn the front axle 48 with its two wheels 30, 30 to steer the machine.

Having thus described my invention, what I claim and desire to secure by Letters Patent of the United States is the following:

1. A motor wagon comprising a transverse frame member formed with means for receiving a wagon box directly upon the upper surface thereof, depending arms formed integrally on and adjacent the ends of said transverse member, rigid axle stubs extending outwardly from said arms, traction wheels on said axle stubs, a power plant positioned below the transverse member and rigidly connected thereto and to the depending arms, said power plant including connections to each of said wheels for rotating the same.

2. A motor wagon comprising a transverse frame member formed with means for receiving a wagon box directly upon the upper surface thereof, depending arms formed integrally on and adjacent the ends of said transverse member, axle stubs extending outwardly from said arms intermediate the ends thereof, traction wheels on said axle stubs, a frame system secured to said depending arms by longitudinal bolts, a power plant secured to said frame system and to the transverse member, said power plant including connections to each of said wheels for rotating the same.

In testimony whereof I have affixed my signature in the presence of two subscribing witnesses.

HENRY M. KINNEY.

Witnesses:
R. W. PIERCE,
ALTON L. WYMAN.

---

Copies of this patent may be obtained for five cents each, by addressing the "Commissioner of Patents, Washington, D. C."